United States Patent Office 3,451,975
Patented June 24, 1969

3,451,975
PROCESS FOR POLYMERIZING LACTAMS
Istvan Gaspar and Antal Schnitta, Budapest, Hungary, assignors to Licencia Talalmanyokat Ertekesito Vallalat, Budapest, Hungary
No Drawing. Filed Apr. 12, 1965, Ser. No. 447,523
Claims priority, application Hungary, Apr. 17, 1964, GA-736; Apr. 5, 1965, Schi-84
Int. Cl. C08g 20/10
U.S. Cl. 260—78    6 Claims

ABSTRACT OF THE DISCLOSURE

Process for polymerizing lactams containing more than 6 members, which comprises melting the lactam, adding thereto an activator of the general formula $$R_1-CO-N-CO-R_3$$
$$\phantom{R_1-CO-}|$$
$$R_2-N-R_4$$

wherein $R_1$ is an alkyl, aryl or hydroaromatic radical, $R_2$ is acyl, $R_3$ is an alkyl, aryl or —NH— aryl radical, and $R_4$ is hydrogen or —CO—NH—$C_6H_5$ and/or an activator of the general formula $$R_5-CY-N_3 \quad \text{or} \quad R_5\!\!\begin{array}{c}\diagup CY-N_3 \\ \diagdown CY-N_3\end{array}$$

wherein $R_5$ is alkyl, aryl, hydroaryl or amino, and Y is oxygen or sulphur; the amount of the activator is 0.1 to 8% by weight. Known catalysts are also employed. The polymerization of the thus obtained mixture is carried out at temperatures ranging from 125 to 190° C.

---

It is known that lactams containing more than 6 members can be polymerized also at temperatures not exceeding the melting point of the polymer, e.g., at 130–170° C. at very high rates, within 10–15 minutes, under the influence of alkalies and compounds of activating effect, e.g., carbo-diimides, isocyanates, organic cyanides, organic acid anhydrides and acyl lactams. This process rendered possible the manufacturing of polyamide castings of high dimensions, free from inner stresses and shrinkage voids as well as the association of polyamides with reinforcing materials.

The processes known hitherto show, however, several disadvantages which hinder to a high degree the large-scale employment of the processes. The increased sensitivity of the known processes against moisture is especially disadvantageous. The polymerisation becomes uncontrollable, the rate of reaction decreases and the quality of the final product is not satisfactory if the moisture content of the lactam exceeds 0.05%, or if any of the components of the casting equipment getting into contact with the lactam or any of the reinforcing materials or the mould-sealing material is not fully dry. Therefore, the process can be initiated and controlled only with difficulties. A further disadvantage of the processes known hitherto consists in the fact that the molecular weight and molecular-weight distribution, respectively, of the polyamide produced considerably changes under the influence of temperature, and the crystallinity of the finished product is generally not satisfactory; consequently, the mechanical properties of the obtained articles are not satisfactory either.

The general use of the polymerisation of this type was hindered also by the fact that the initiating effect of the known activators depends to a high degree on the temperature. The reaction is exothermic; consequently, it is very difficult to ensure the best temperature conditions. Therefore, difficulties appearing insolvable arose in case of casting articles, the wall thickness of which varies between wide limits, such as when casting ship propellers where at large wall thicknesses the process is practically adiabatic, while at small wall thicknesses the process is isothermic. Therefore large temperature differences occur, and thus, due to the relatively low temperature, the thin parts or the crust of the mould are usually formed by a deficient polyamide of a low degree of polymerisation and of inferior quality both from aesthetical and mechanical points of view. At the same time, under the influence of the high temperatures occurring during the exothermic polymerisation process and under the adiabatic conditions, in the interior part of the casting shrinkage voids are formed which often appear in the form of small so-called "micro inclusions." Similar phenomena can be observed even in the case of centrifugal castings because during casting the rotating instrument quickly cools down and thereby it requires a strong warming. Therefore, in the case of centrifugal casting, too it is difficult to maintain the narrow limits of temperature necessary for the good functioning of the known activators.

The strong dependence on the temperature of the effect of the known activators rendered inhomogeneous not only the macro structure but also the micro structure of the castings.

A considerable difficulty in the general use of the known activators was their toxic effect as well. Namely, although the activators are needed only in small concentrations, relatively high amounts of activator vapours are being developed while casting, and this fact hindered the general use of the lactam polymerisation.

The object of the invention is to eliminate the above-mentioned disadvantages and to ensure a process which, by the use of non-toxic activators, renders possible the reproducible and safe polymerisation of lactams having more than 6 members, the building-in of reinforcing materials, the repeated processability of polyamide scraps, and the manufacturing of castings having surfaces and crusts of good quality.

The basis of the invention is the discovery that lactams having more than 6 members can be readily polymerised without the above-mentioned disadvantages if activators of new types are employed.

The invention is a process for polymerizing lactams containing more than 6 members, comprising the steps of melting the lactams, adding activator hydrazides of the general formula $$R_1-CO-N-CO-R_3$$
$$\phantom{R_1-CO-}|$$
$$R_2-N-R_4$$

are used, in which $R_1$ is an alkyl, aryl and hydroaromatic radical, $R_2$ is an acyl radical, $R_3$ stands for alkyl, aryl or —NH— aryl radicals, and $R_4$ is hydrogen or $$-CO-NH-C_6H_5$$

and wherein the azides have the general formula $$R_5-CY-N_3$$

wherein $R_5$ consists of an alkyl, aryl, hydroaryl or amino radical, and Y is oxygen or sulphur, the activator being added in an amount ranging from 0.1 to 8% by weight, calculated on the lactam melt, addition agents in an amount of 0 to 45% by weight, and a catalyst in an amount of 0.02 to 0.8 percent by weight, calculated on the lactam melt, polymerizing the thus-obtained mixture in a mould at a temperature between 125 and 190° C. for at least 3 minutes, cooling the said mould and removing the thus-obtained polymer product from the said mould.

Lactams with a ring containing at least 7 members obtained from omega-amino-carboxylic acids, e.g., caprolactam, oenantholactam, caprylolactam, laurolactam etc. or a mixture thereof can be readily and quickly polymerized.

Lactams substituted on a carbon atom, e.g., 4-isopropyl-caprolactam can also be used.

In compliance with the process according to the invention, the following catalysts can be preferably employed:

N-propionyl-phthaloyl-cyclohydrazide,
N-benzoyl-camphoric-acid-cyclohydrazide,
1,2 - cyclophenylene - 3,4 - bis-anilide-tetracarbonylhydrazide,
N-acetyl-N'-benzoyl-succinyl-cyclohydrazide,
N-benzoyl-N'-acetyl-N'-propionyl-hydrazide,
propionyl-azide,
benzoyl-azide,
dithioglutaric-acid-diazide,
thiocarbamic-acid-azide,
N-phenyl-N-acetyl-thiocarbamic-acid-azide,
camphoric-acid-diazide etc.

A mixture of the activators of hydrazide and azide types can be preferably used when the heat-capacity of the mould is considerable as compared with that of the lactam melt to be polymerized. This is the case, e.g., when casting ship propellers of large dimensions. In such cases most advantageous results can be obtained if the amount of the activator of azide type is smaller than or preferably 20–30% of that of the activator of hydrazide type.

In the case of the process according to the invention, weakly basic catalysts, e.g., the alkaline salts of aromatic acids or even sodium hydrogen carbonate can be used with good results, besides the strong alkalies, e.g., lithium sodium and potassium metals, hydroxides and hydrides used till now.

Before polymerisation, various additive agents, such as reinforcing materials, e.g., asbestos and glass rovings, stabilizers, dyestuffs, pigments, lubricating materials, e.g., graphite, molybdenum disulphide and polytetrafluoro ethylene, substances regulating the crystallization, e.g., barium sulphate and active black, and even polyamide scraps can be mixed to the lactam. The additive agents may be arranged in the mould as well, before introducing into it the lactam melt.

A preferred embodiment of the process according to the invention consists in melting the lactam at a temperature of 140–145° C., adding the activator in an amount of 0.5 to 1% by weight, the catalysts in an amount of 0.05 to 0.5% by weight and the additive agents in an amount of 0 to 45% by weight, warming the mixture to a temperature of 140–145° C. and casting it into a mould preheated to a temperature of about 150–170° C. Thereafter the mould containing the melt is heated to a temperature of about 160–170° C. for 15–20 minutes, whereafter the mould is cooled to about 50–60° C. and the polymer product is removed from the mould.

Another preferred embodiment of the process according to the invention consists in feeding a part or the whole amount of the activators and/or catalysts into the mould, preferably dissolved in a suitable solvent or in a part of the lactam melt.

If a reinforcing material is employed, it is preferable to impregnate it with a part or the whole amount of the activators and/or catalysts dissolved as described above. A part of the lactam may be also separately introduced into mould.

With the aid of the process according to the invention, polymeric castings of good quality in their whole cross-section and with unobjectionable surface can be obtained even if the starting lactam monomers are not dried at all. Also polyamide scraps can be employed because their possible water content does not interfere with the function of the activators to be used in accordance with the process according to the invention. The castings are fully free from air inclusions and shinkage voids and thus, their density can be readily reproduced. Due to their homogeneous structure, favourable molecular-weight distribution and high molecular weight, the mechanical properties of the castings are very advantageous even at relatively high temperatures, e.g. the tensile strength of the polymers decreases only by 48% (from a value of 8.7 kg./mm.$^2$ to a value of 4.5 kg./mm.$^2$) between the temperature limits of 20° C. and 218° C.

The quality of the castings is unobjectionable even if they are manufactured under circumstances when the temperature can be controlled only with difficulties, e.g., in the case of centrifugal castings, or when manufacturing articles having very large differences in the wall thickness, e.g., when casting ship propellers or gears of large dimensions.

The process according to the invention is further illustrated by the aid of the following examples.

Example 1

In a stainless steel autoclave of a volume of 2 litres 10 moles (1130 g.) of omega-amino-caprolactam of commercial quality and moisture content are melted. Then 0.2 molar percent (4.36 g.) of N-propionyl-phthaloyl-cyclohydrazide calculated on the lactam, are added. The temperature of the melt is increased to 140° C., then while stirring 0.3 molar percent (0.69 g.) of sodium metal are added. The metal sodium dissolves with effervescence and equivalent amount of sodium-omega-amino-caprolactam is formed. After the sodium metal has completely dissolved, the melt is cast into an aluminum ship-propeller mould having thin walls and preheated to 160° C., the propeller having 4 blades of 150 mm. length. The mould containing the melt is kept for 20 minutes at 160° C. in a drying oven, where the polymerisation immediately begins; the melt becomes more and more viscous, then it solidifies, and the polymerisation is continued in the solid phase; it is finished in 20 minutes by reaching high molecular weights. Then the casting is removed from the mould and conditioned in the usual way. The surface of the propeller casting has an unobjectionable quality; the molecular weight and the crystal structure of the moulding is homogeneous through the whole cross-section of the propeller, and no shrinkage voids can be observed in it (density: 1.15 g./cm.$^3$). The tensile strength of the test piece processed from the propeller amounts to 950° kg./cm.$^2$ and the impact energy of a grooved test piece amounts to 20 cm./kg./cm.$^2$.

If the casting is carried out under identical conditions, but instead of the above-mentioned activator the polymerisation is carried out with any of the known activators, then the time of polymerisation increases from 20 minutes to 3 hours and the moulding obtained is a faulty product because its surface is formed by a rigid polyamide of low grade of polymerisation and its interior contains shrinking voids.

Example 2

One proceeds as described in Example 1 but, instead of N-propionyl-phthaloyl-cyclohydrazide, 0.4 molar percent (12 g.) of N-benzoyl-camphoric-acid-cyclohydrazide is used as activator, calculated on the lactam melt. After casting into the mould, the polymerisation immediately begins and takes place in 10 minutes. The moulding obtained is of unobjectionable quality.

Example 3

The mixture of 85 moles (9.6 kg.) of omega-amino-caprolactam and 15 moles (2.95 kg.) of omega-amino-laurolactam is melted, whereafter, calculated on the lactam melt, 0.1% by weight (12.5 g.) of active black and 3.0% by weight (376 g.) of molybdenum disulphide are added to the lactam melt. The temperature of the mixture is increased under stirring to 145° C., then 0.4 molar percent (1.56 g.) of sodium amide are added. The melt prepared for polymerisation in this way is transferred by the aid of nitrogen into a closed bevel-gear mould of 14–16 modules, pre-heated to 150° C., in which 6.25 kg. of glass rovings impregnated with 0.6 molar percent (153 g). of N-acetyl-N'-benzoyl-succinyl-cyclohydrazide activator dissolved in 800 ml. of acetone, had been previously placed. Then after inserting a lactam trap before the vacuum pump, the pressure is decreased in the mould for 2 minutes to 30 mm. Hg so that the reinforcing glass rovings are completely impregnated by the lactam. The polymerisation takes place in a drying oven of a temperature of 170° C. during 5 minutes.

If one proceeds in similar way but without the activator according to the invention the polymerisation results in mouldings of unsatisfactory quality, containing air bubbles even if both the lactam and the glass fibres are completely dried before polyemisation and the time of polymerisation is lengthened to 1 hour.

Example 4

One proceeds as described in Example 3, but instead of the N-acetyl-N'-benzoyl-succinyl-cyclohhydrazide 0.1 molar percent (23.4 g.) of N-benzoyl-N'-acetyl-N'-propionyl-hydrazide is used as activator, calculated on the lactam melt. The polymerisation takes place at 160° C. in 12 minutes.

Example 5

One proceeds as described in Example 1 but, instead omega-amino-caprolactam, 10 moles (1270 g.) of omega-amino-oenantholactam, and, instead of the N-propionyl-phthaloyl-cyclohydrazide, 0.1 molar percent (2.72 g.) of 1,2 - cyclophenylene - 3,4 - bis - anilide - tetracarbonyl-hydrazide together with 0.2 molar percent (2.95 g.) of benzoyl azide activators are used, calculated on the lactam melt.

The polymerisation takes place at 125° C. in 15 minutes.

Example 6

One proceeds as described in Example 3 but, instead of the N-acetyl-N'-benzoyl-succinyl-acyclohydrazide, 0.3 molar percent (26 g.) of thiocarbamic acid azide activator is employed, calculated on the lactam melt.

The polymerisation takes place at 180° C. in 8 minutes.

Example 7

113 g. of omega-amino-caprolactam are melted on water bath and 0.3 molar percent (0.44 g.) of camphoric acid diazide are added. Thereafter nitrogen is bubbled through the melt for 15 minutes at a rate of 15 l./hour. 0.07 g. of sodium metal are added to the melt, then the temperature of the melt is increased to 130° C. At this temperature the polymerisation takes place in about 25 minutes.

Example 8

60° g. of omega-amino-caprolactam are melted on a water bath. The temperature of the melt is increased to 150° C. and, while bubbling nitrogen gas through the melt, 0.03 g. of sodium metal and thereafter 0.25 molar percent (0.53 g.) of dithioglutaric acid diazide dissolved in 5 ml. of benzene are added to the lactam melt, calculated on the lactam melt. The polymerisation takes place at 160° C. in 6 minutes.

Example 9

One proceeds as described in Example 8 but, instead of dithioglutaric acid diazide, 0.50 molar percent (0.25 g.) of propionyl azide, calculated on the lactam melt, are added to the melt. The polymerisation takes place at a temperature of 180° C. in 5 minutes.

What we claim is:
1. A process for producing high molecular weight polylactams which comprises heating at a temperature between 125° C. and 190° C.:
(1) a lactam containing more than 6 ring members;
(2) an anionic catalyst for lactam polymerization;
(3) a promoter selected from the group consisting of
N-propionyl-phthaloyl-cyclohydrazide,
N-benzoyl-camphoric-acid-cyclohydrazide,
1,2-cyclophenylene-3,4-bis-anilide-tetracarbonyl-hydrazide,
N-acetyl-N'-benzoyl-succinyl-cyclohydrazide,
N-benzxoyl-camphoric-acid-cyclohydrazide,
propionyl-azide,
benzoyl-azide,
dithioglutaric-acid-diazide,
thiocarbamic-acid-azide,
N-phenyl-N-acetyl-thiocarbamic-acid-azide,
camphoric-acid-diazide.
2. The process according to claim 1, wherein the promotor consists of camphoric-acid-diazide.
3. The process according to claim 1, wherein the promoter consists of N-propionyl-phthaloyl-cyclohydrazide.
4. The process according to claim 1, wherein the promoter consists of benzoyl-azide.
5. The process according to claim 1, wherein the promoter consists of N-phenyl-N-acetyl-thiocarbamic-acid-azide.
6. The process according to claim 1, wherein the promoter consists of dithioglutaric-acid-diazide.

References Cited

UNITED STATES PATENTS

| 3,017,391 | 1/1962 | Mottus et al. | 260—78 |
| 3,206,418 | 7/1965 | Giberson | 260—78 |
| 3,216,976 | 11/1965 | Schwartz et al. | 260—78 |
| 3,234,152 | 2/1966 | Fuller | 260—78 |
| 3,250,750 | 5/1966 | Pietrusza et al. | 260—78 |

HAROLD D. ANDERSON, *Primary Examiner.*

U.S. Cl. X.R.

260—37, 857